United States Patent
Masuda (10) Patent No.: US 7,973,913 B2
(45) Date of Patent: Jul. 5, 2011

(54) DISTANCE MEASUREMENT APPARATUS AND METHOD

(75) Inventor: Tomonori Masuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 76 days.

(21) Appl. No.: 12/576,617

(22) Filed: Oct. 9, 2009

(65) Prior Publication Data

US 2010/0091264 A1  Apr. 15, 2010

(30) Foreign Application Priority Data

Oct. 15, 2008 (JP) .................................. 2008-266087

(51) Int. Cl.
*G01C 3/08* (2006.01)
(52) U.S. Cl. ........................................................ 356/5.1
(58) Field of Classification Search ................. 356/4.01, 356/5.01, 5.1; 382/106
See application file for complete search history.

(56) References Cited

U.S. PATENT DOCUMENTS

| 7,645,974 B2 * | 1/2010 | Ikeno et al. ................... 250/205 |
| 2008/0205709 A1 * | 8/2008 | Masuda et al. ................ 382/106 |

FOREIGN PATENT DOCUMENTS

| JP | 2006-23178 | 1/2006 |
| JP | 2006-201037 | 8/2006 |
| JP | 2006-337286 | 12/2006 |

* cited by examiner

*Primary Examiner* — Isam Alsomiri
(74) *Attorney, Agent, or Firm* — McGinn IP Law Group, PLLC

(57) ABSTRACT

Emitting stripe pattern light, whose intensity changes periodically, onto a subject while shifting the phase of the pattern by $\pi/2$ from a reference phase of 0 until the phase is shifted one cycle to receive reflected light by an image sensor at each of phases 0, $\pi/2$, $\pi$, and $3\pi/2$. From received light signals obtained at four phases, calculating a phase difference between the stripe pattern light and reflected light thereof with respect to each light receiving element to calculate distance information representing a distance to the subject based on the phase difference. In this case, the distance information is calculated only from a light receiving element having an absolute value of the difference between a first added signal of received light signals at 0 and $\pi$ and a second added signal of received light signals at $\pi/2$ and $3\pi/2$ smaller than a specific value.

4 Claims, 5 Drawing Sheets

FIG.3A 0

FIG.3B $\frac{\pi}{2}$

FIG.3C $\pi$

FIG.3D $\frac{3\pi}{2}$

DISTANCE MEASUREMENT APPARATUS AND METHOD

BACKGROUND OF THE INVENTION

1. Field of the Invention

The present invention relates to a distance measurement apparatus and method for measuring a distance to a subject. The invention also relates to a computer readable recording medium on which is recorded a program for causing a computer to perform the distance measurement method.

2. Description of the Related Art

As a method for measuring distance to a subject, a phase shift method is known. The phase shift method is a method in which stripe pattern light that sinusoidally changes in intensity is repeatedly emitted to a subject, while shifting the phase of the pattern by $\pi/2$, until the phase of the stripe pattern light is shifted one cycle, reflected light is received at four phases of $0$, $\pi/2$, $\pi$, and $3\pi/2$ in the phase shift cycle of the stripe pattern light to obtain received light signals according to the amount of received light, and a phase delay (phase difference) between the stripe pattern light and reflected light is detected by each light receiving element of an image sensor provided in a photographing device based on the received light signals, whereby distance information is calculated.

Here, when measuring a distance by the phase shift method, luminance represented by the received light signal may sometimes be saturated or the contrast of the received light signal may sometimes be decreased due to a change in material properties of the surface of a subject or a change in the surface of the subject. In such a case, the distance can not be measured accurately. Consequently, for a received light signal having saturated luminance or a low contrast, a method for determining the reliability of a phase difference calculated by the light receiving element using received light signals of light receiving elements surrounding the light receiving element is proposed as described, for example, in Japanese Unexamined Patent Publication No. 2006-023178.

The method described in Japanese Unexamined Patent Publication No. 2006-023178, however, may sometimes obtain a received light signal which is not suitable for distance measurement due to, for example, defective emission of stripe pattern light, reception of outside light other than the reflected light, output of received light signal not proportional to the amount of reflected light due to malfunction of the light receiving element, or the like. Use of such a received light signal which is not suitable for distance measurement may result in the calculation of erroneous distance information.

The present invention has been developed in view of the circumstances described above, and it is an object of the present invention to prevent erroneous distance measurement when measuring a distance by a phase shift method.

SUMMARY OF THE INVENTION

A distance measurement apparatus of the present invention is an apparatus, including:

an emission unit for emitting stripe pattern light, whose intensity changes periodically, to a subject while shifting the phase of the pattern;

an imaging unit which includes an image sensor having a plurality of light receiving elements, disposed two-dimensionally, for receiving reflected light of the stripe pattern light reflected from the subject and outputting a received light signal according to the amount of light received;

an imaging control unit for controlling the emission unit and the imaging unit such that the stripe pattern light is emitted to the subject by shifting the phase of the pattern of the stripe pattern light by $\pi/2$ from a reference phase until the phase of the pattern light is shifted one cycle and the reflected light is received at the reference phase and at each of phases shifted by $\pi/2$, $\pi$, and $3\pi/2$ from the reference phase; and a distance information calculation unit for calculating, with respect to each light receiving element, a phase difference between the stripe pattern light and the reflected light of the stripe pattern light from received light signals at four phases obtained by each light receiving element in relation to the one phase shifting cycle of the stripe pattern light, and calculating, with respect to each light receiving element, distance information representing a distance to the subject based on the phase difference, wherein the distance information calculation unit is a unit that calculates an absolute value of difference between a first added signal and a second added signal, the first added signal being a signal obtained by adding the received light signals at the reference phase and at the phase shifted by $\pi$ from the reference phase, and the second added signal being a signal obtained by adding the received light signals at the phases shifted by $\pi/2$ and $3\pi/2$ from the reference phase among the received light signals at four phases, and calculates the distance information only from a light receiving element having an absolute value smaller than a specific value.

The stripe pattern light may be any light as long as it is modulated such that the intensity thereof is changed continuously and the intensity may be changed, for example, in the manner of a sinusoidal wave, a triangular wave, or a saw-tooth wave.

In the distance measurement apparatus of the present invention, the distance information calculation unit may be a unit that sets the specific threshold value as a function of a predetermined received light signal among the received light signals at four phases.

A distance measurement method of the present invention is a method for use with a distance measurement apparatus which includes: an emission unit for emitting stripe pattern light, whose intensity changes periodically, to a subject while shifting the phase of the pattern; an imaging unit which includes an image sensor having a plurality of light receiving elements, disposed two-dimensionally, for receiving reflected light of the stripe pattern light reflected from the subject and outputting a received light signal according to the amount of light received; an imaging control unit for controlling the emission unit and the imaging unit such that the stripe pattern light is emitted to the subject by shifting the phase of the pattern of the stripe pattern light by $\pi/2$ from a reference phase until the phase of the pattern light is shifted one cycle and the reflected light is received at the reference phase and at each of phases shifted by $\pi/2$, $\pi$, and $3\pi/2$ from the reference phase; and a distance information calculation unit for calculating, with respect to each light receiving element, a phase difference between the stripe pattern light and the reflected light of the stripe pattern light from received light signals at four phases obtained by each light receiving element in relation to the one phase shifting cycle of the stripe pattern light, and calculating, with respect to each light receiving element, distance information representing a distance to the subject based on the phase difference, the method comprising the steps of:

calculating an absolute value of difference between a first added signal and a second added signal, the first added signal being a signal obtained by adding the received light signals at the reference phase and at the phase shifted by $\pi$ from the reference phase, and the second added signal being a signal obtained by adding the received light signals at the phases shifted by $\pi/2$ and $3\pi/2$ from the reference phase among the received light signals at four phases; and calculating the distance information only from a light receiving element having an absolute value smaller than a specific value.

The distance measurement method of the present invention may be provided as a program, to be performed by a computer, recorded on a computer readable recording medium.

According to the present invention, among received light signals at four different phases of reference phase and phases shifted by $\pi/2$, $\pi$, and $3\pi/2$ from the reference phase, received light signals at the reference phase and at the phase shifted by $\pi$ from the reference phase are added to obtain a first added signal and received light signals at the phases shifted by $\pi/2$ and $3\pi/2$ from the reference phase are added to obtain a second added signal, whereby an absolute value of difference between the first and second added signals is obtained, and distance information is calculated only from a light receiving element having an absolute value smaller than a specific value.

Here, if defective emission of stripe pattern light, reception of outside light other than the reflected light, malfunction of a light receiving element, or the like is not taking place, values of the first and second added signals substantially correspond to each other. Conversely, when values of the first and second added signals do not substantially correspond to each other, it can be said that defective emission of stripe pattern light, reception of outside light other than the reflected light, malfunction of a light receiving element, or the like is taking place.

Accordingly, by calculating distance information only from a light receiving element having an absolute value of difference between the first and second added signals smaller than a specific threshold value, erroneous distance measurement arising from the use of a received light signal inappropriate for distance measurement may be prevented, whereby the distance information may be calculated accurately.

Setting of the specific threshold value by a function of a received light signal allows the threshold value to be set according to the amount of reflected light.

DESCRIPTION OF THE PREFERRED EMBODIMENTS

Figure 1:
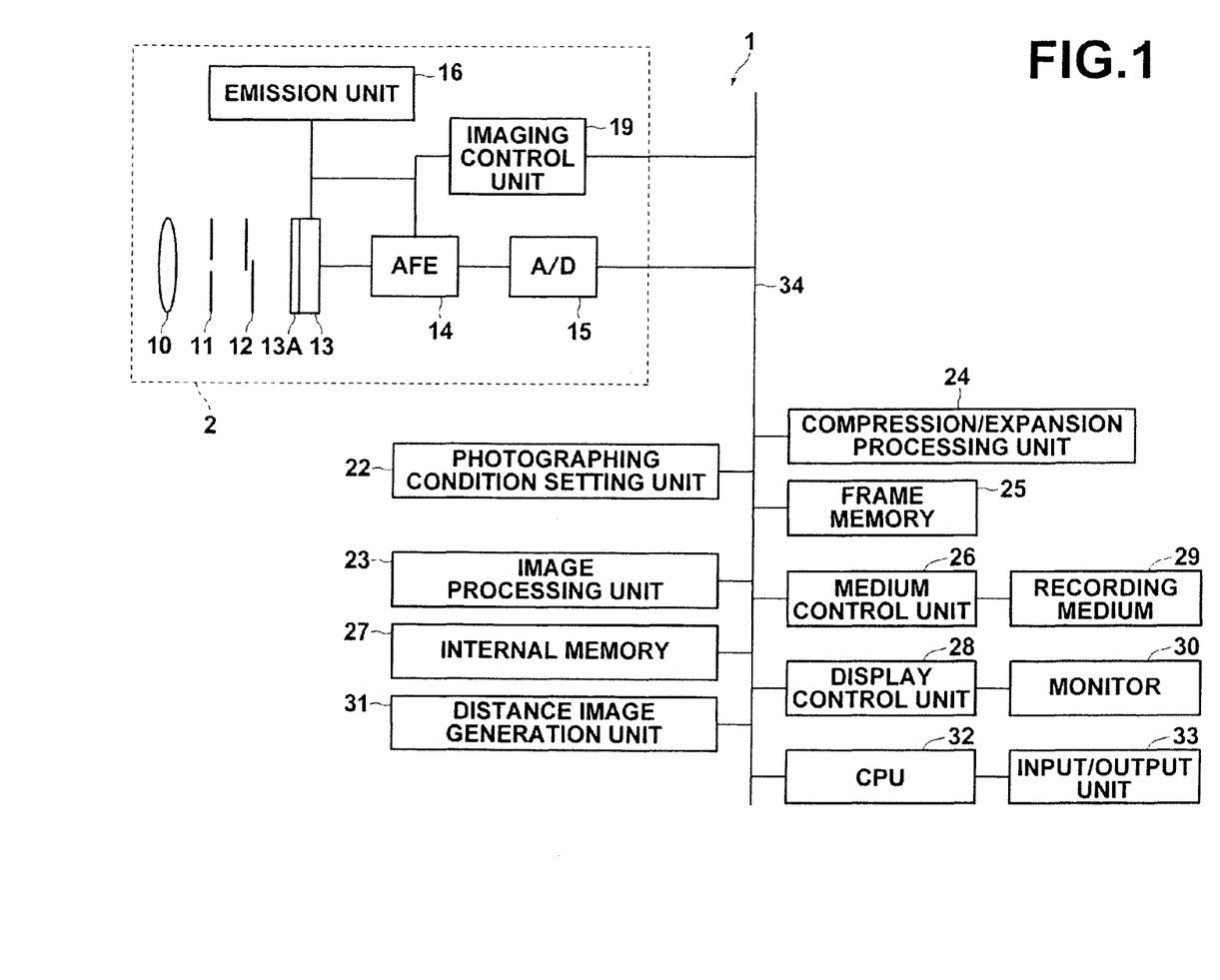
FIG. 1 is a schematic diagram of a distance measurement apparatus according to an embodiment of the present invention, illustrating the configuration thereof.

Hereinafter, an embodiment of the present invention will be described with reference to the accompanying drawings. FIG. 1 is a schematic block diagram of a distance measurement apparatus according to an embodiment of the present invention, illustrating the configuration thereof. As illustrated in FIG. 1, distance measurement apparatus 1 includes imaging unit 2.

Imaging unit 2 includes lens 10, aperture 11, shutter 12, CCD 13, analog front end (AFE) 14, and A/D conversion unit 15.

Lens 10 includes a plurality of functional lenses, such as a focus lens for bringing a subject into focus, a zoom lens for realizing a zoom function and the like, and positions of the lenses are controlled by a not shown lens drive unit.

The aperture diameter of aperture 11 is controlled by a not shown aperture drive unit based on aperture value data determined in advance.

Shutter 12 is a mechanical shutter and is driven according to a specific shutter speed.

CCD 13 is an image sensor having a photoelectric surface that includes multiple light receiving elements disposed two-dimensionally, and a light image representing a subject is formed on the photoelectric surface and subjected to photoelectric conversion, whereby a received light signal of analog image signal is obtained. A light receiving period of CCD 13 is controlled by an electronic shutter drive signal outputted from imaging control unit 19, to be described later. Color filter 13A that transmits light in a wavelength range of stripe pattern light, to be described later, is disposed in front of CCD 13, so that the light receiving elements of CCD 13 may receive only reflected light of the stripe pattern light.

AFE 14 performs processing on a received light signal outputted from CCD 13 for removing noise and adjusting gain (analog processing).

A/D conversion unit 15 converts the received light signal analog-processed by AFE 14 to a digital signal.

Imaging unit 2 further includes emission unit 16 for emitting stripe pattern light onto a subject.

Figure 2:
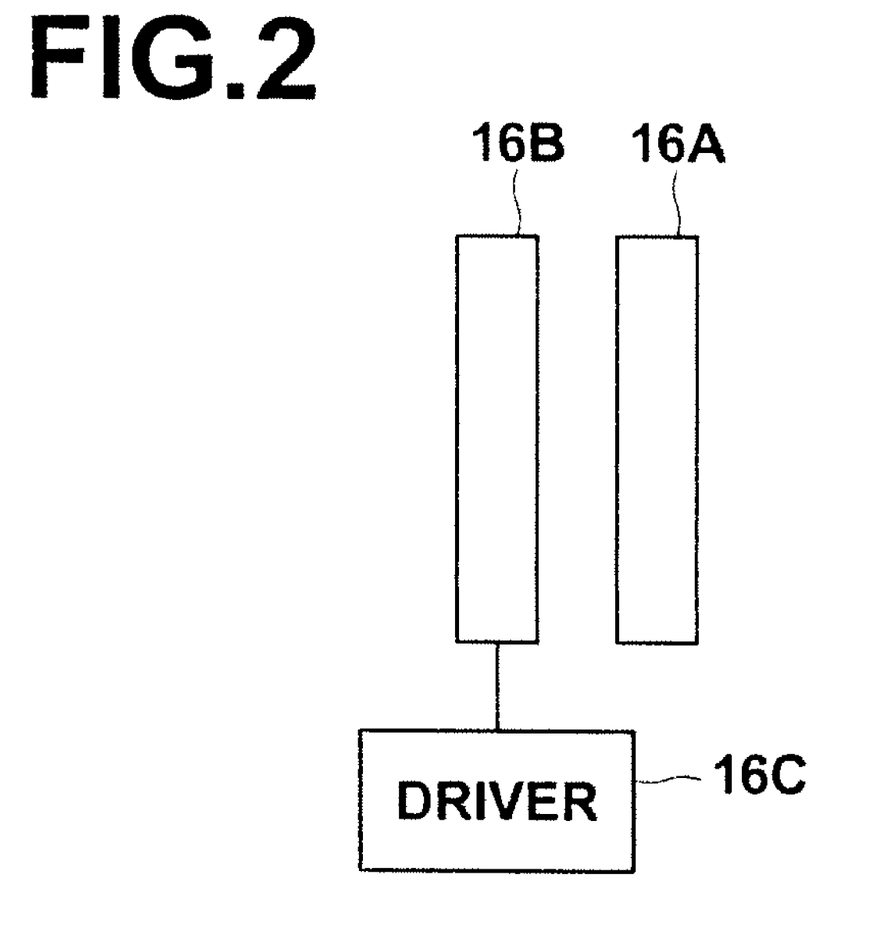
FIG. 2 is a schematic block diagram of the emission unit, illustrating the configuration thereof.

FIG. 2 is a schematic block diagram of the emission unit, illustrating the configuration thereof. As illustrated in FIG. 2, emission unit 16 includes surface light source 16A on which a plurality of LEDs is disposed two-dimensionally for emitting light, liquid crystal 16B for converting light emitted from surface light source 16A to stripe pattern light, and driver 16C for displaying a stripe pattern on liquid crystal 16B.

Driver 16C displays a stripe pattern that sinusoidally changes in intensity in response to an instruction from imaging control unit 19, to be described later. Further, driver 16C shifts the phase of the stripe pattern by $\pi/2$ in response to an instruction from imaging control unit 19. This causes the light emitted from surface light source 16A to transmit through liquid crystal 16B and turn to stripe pattern light.

Imaging unit 2 further includes imaging control unit 19 for drive controlling CCD 13, AFE 14, and emission unit 16. Imaging control unit 19 causes emission unit 16 to emit stripe pattern light, shifting in phase by $\pi/2$, by instructing driver 16C to display a stripe pattern and controls each component of imaging unit 2 so as to receive reflected light of the stripe pattern light reflected from the subject in timing with the phase shifting of the stripe pattern light and to output a received light signal according to the amount of received light in response to an instruction from CPU 32. Emission control of stripe pattern light and acquisition control of a received light signal from each light receiving element of CCD 13 will be described later.

Distance measurement apparatus 1 further includes photographing condition setting unit 22, image processing unit 23, compression/expansion unit 24, frame memory 25, medium control unit 26, internal memory 27, and display control unit 28.

Photographing condition setting unit 22 has specific focal length, aperture value, and shutter speed stored therein, and outputs the focal length, aperture value, and shutter speed to imaging unit 2 at the time of photographing.

Image processing unit 23 performs image processing, such as tone correction and sharpness correction, on image data of a distance image generated in the manner described later.

Compression/expansion unit 24 generates an image file by performing compression processing, for example, in JPEG compression format or the like, on the image data of a distance image processed by image processing unit 23. A tag that includes auxiliary information, such as the date and time of photographing and the like, is attached to the image file based on Exif format or the like.

Frame memory 25 is a work memory used when various types of processing, including the processing of image processing unit 23, are performed on a received light signal obtained by imaging unit 2.

Medium control unit 26 gains access to recording medium 29 and controls read/write operations of a distance image file.

Internal memory 27 has stored therein various constants to be set in distance measurement apparatus 1, programs to be executed by CPU 33, and the like.

Display control unit 28 causes image data stored in frame memory 25 or an image recorded in recording medium 29 to be displayed on monitor 30.

Distance measurement apparatus 1 further includes distance image generation unit 31 and CPU 32.

Distance image generation unit 31 calculates, with respect to each light receiving elements of CCD 13, distance information D1 from distance measurement apparatus 1 to each point of a subject using a received light signal obtained by imaging unit 2. Hereinafter, the calculation of distance information D1 will be described.

Distance image generation unit 31 calculates distance information D1 by a phase shift method. More specifically, distance image generation unit 31 calculates a phase difference between stripe pattern light and reflected light reflected from a subject, and calculates distance information D1 based on the phase difference.

Figure 3A:
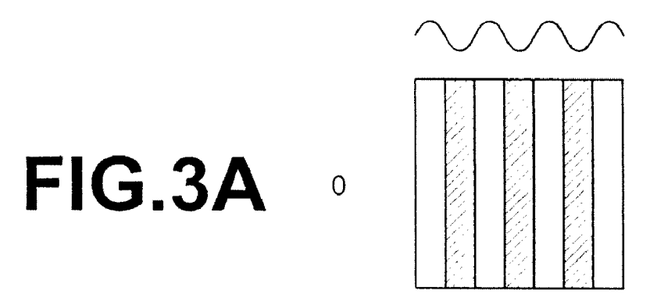
FIGS. 3A to 3D are drawings for explaining the emission of stripe pattern light and reception of reflected light.
Figure 3B:
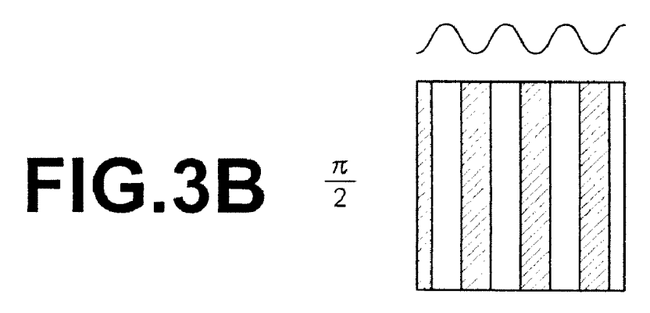
Figure 3C:
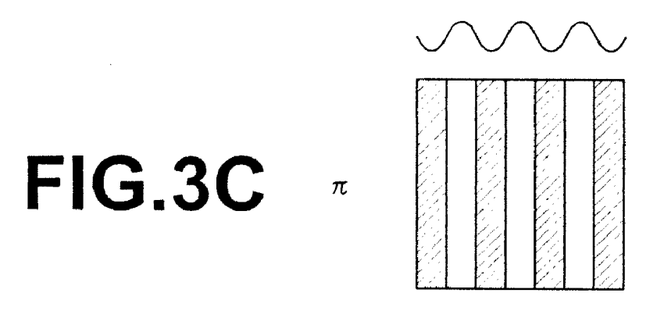
Figure 3D:
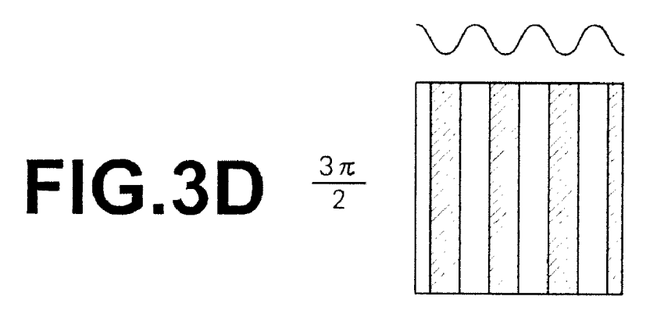

FIGS. 3A to 3D illustrate emission of stripe pattern light and reception of reflected light. In the present embodiment, the pattern light is emitted to the subject in the manner as illustrated in FIG. 3A to perform initial reception of reflected light. FIG. 3A serves as the reference of the phase shift cycle of the pattern so that the phase is deemed to be 0 (reference phase). Next, the stripe pattern light is emitted to the subject by shifting the phase from the reference phase by $\pi/2$ as shown in FIG. 3B to perform second reception of reflected light. Next, the stripe pattern light is emitted to the subject by shifting the phase from the reference phase by $\pi$ as shown in FIG. 3C to perform third reception of reflected light. Then, the stripe pattern light is emitted to the subject by shifting the phase by $3\pi/2$ from the reference phase as shown in FIG. 3D to perform fourth reception of reflected light.

Figure 4:
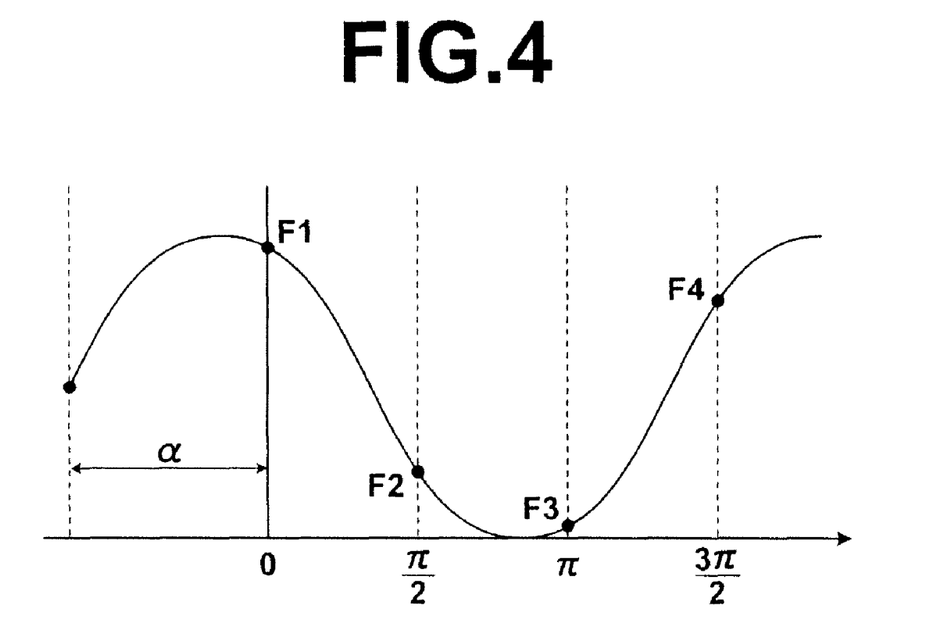
FIG. 4 is a drawing for explaining the calculation of phase difference.

FIG. 4 is a drawing for explaining the calculation of phase difference. In FIG. 4, the amounts of reflected light received at 0, $\pi/2$, $\pi$, and $3\pi/2$ in the phase shift cycle of the stripe pattern light are denoted by F1, F2, F3 and F4 respectively. As illustrated in FIG. 4, even when the amount of reflected light is changed due to the state or color of the surface of the position of the subject, a relative difference in the amount of light always represents the amount of conversion corresponding to phase difference α of the pattern.

Here, the amounts of received light correspond to received light signals outputted from each light receiving element at phases of 0, $\pi/2$, $\pi$, and $3\pi/2$ of the stripe pattern light. Therefore, if reference symbols F1, F2, F3, and F4 are also used to denote received light signals, hereinafter, the relationship between received light signals F1, F2, F3 and F4 and phase difference α is expressed by Formula (1) below.

$$\alpha = \tan^{-1}\{(F3-F1)/(F2-F4)\} \quad (1)$$

Then, distance image generation unit calculates distance information D1 from phase difference α by Formula (2) below.

$$D1 = c \cdot \alpha/(4\pi F) \quad (2)$$

where, c is the light speed and F is the frequency ($=\omega/2\pi$).

Further, distance image generation unit 31 generates distance image S1 with distance information D1 calculated with respect to each light receiving element as the pixel value of each pixel.

In the mean time, if defective emission of stripe pattern light from emission unit 16, reception of outside light other than the reflected light by imaging unit 2, malfunction of a light receiving element, or the like is not taking place, a first added signal obtained by adding received light signal F1 at the reference phase and received light signal F3 at the phase shifted by $\pi$ from the reference phase (F1+F3) substantially corresponds to a second added signal obtained by adding received light signal F2 at the phase shifted by $\pi/2$ from the reference phase and received light signal F4 at the phase shifted by $3\pi/2$ from the reference phase (F2+F4). Accordingly, if the value of the first added signal (F1+F3) and the value of the second added signal (F2+F4) do not substantially correspond to each other, it can be said that defective emission of stripe pattern light from emission unit 16, reception of outside light other than the reflected light by imaging unit 2, malfunction of a light receiving element in CCD 13, or the like is taking place.

Consequently, before calculating distance information D1, distance image generation unit 31 calculates an absolute value of difference between the first added signal (F1+F3) and second added signal (F2+F4) using received light signals F1, F2, F3, and F4, then compares the absolute value to threshold value Th1, and calculates distance information D1 only for a light receiving element which has obtained received light signals causing the absolute value less than threshold value Th1.

Threshold value Th1 is set based on a function of received light signals. In the present embodiment, the first added signal (F1+F3) is multiplied by specific coefficient k0 and the calculated value, k0 (F1+F3), is used as threshold value Th1. Note that the second added signal (F2+F4) may be multiplied by coefficient k0 and the calculated value k0(F2+F4) may be used as threshold value Th1.

CPU 32 controls each component of distance measurement apparatus 1 according to a signal from input/output unit 33.

Data bus 34 is connected to each component of distance measurement apparatus and CPU 32, and various types of data and information in distance measurement apparatus 1 are exchanged through the bus.

Figure 5:
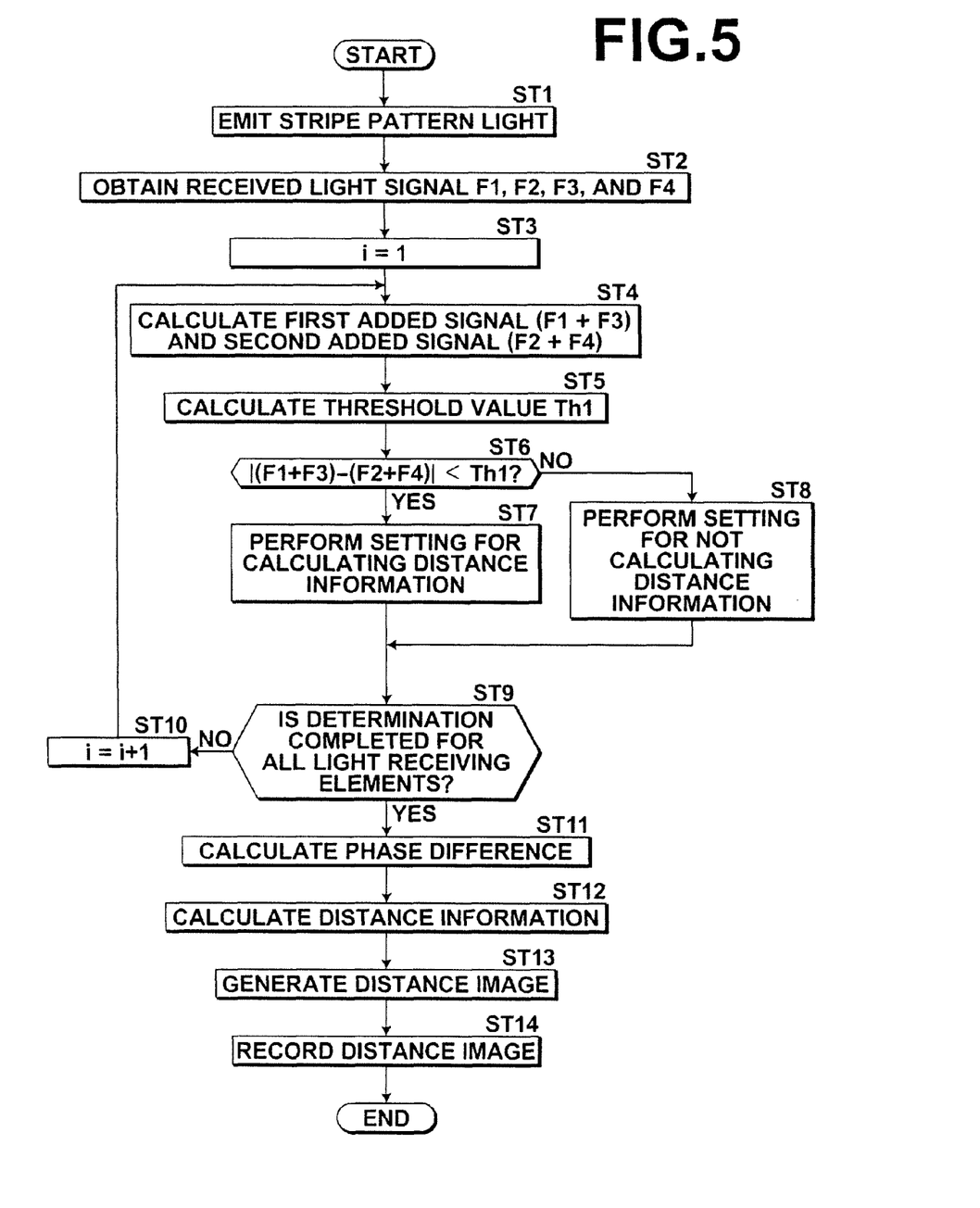
FIG. 5 is a flowchart illustrating a process performed in the embodiment.

A process performed in the present embodiment will now be described. FIG. 5 is a flowchart illustrating the process performed in the present embodiment.

CPU 32 starts the process by receiving a photographing instruction, and photographing unit 2 emits stripe pattern light onto a subject from emission unit 16 while shifting the phase of the pattern by $\pi/2$ in response to an instruction from CPU 32 (step ST1). Then, photographing unit 2 receives reflected light of the stripe pattern light reflected from the subject at phases of 0, $\pi/2$, n, and $3\pi/2$ in the pattern phase shifting, thereby obtaining four received light signals F1, F2, F3, and F4 at each of the light receiving elements of CCD 13 (step ST2).

Next, distance image generation unit 31 sets the target light receiving element for distance information calculation to a first light receiving element (i=1, step ST3). Then, from four received light signals F1, F2, F3, and F4 obtained by the target light receiving element, distance image generation unit 31 calculates a first added signal (F1+F3) and a second added signal (F2+F4) (step ST4), calculates threshold value Th1 by multiplying the first added signal (F1+F3) with coefficient k0 (step ST5), and determines whether or not an absolute value of difference between the first added signal (F1+F3) and the second added signal (F2+F4)|(F1+F3)−(F2+F4)| is smaller than threshold value Th1 (step ST6).

If step ST6 is positive, distance image generation unit 31 sets the target light receiving element as a light receiving element from which distance information D1 is to be calculated (step ST7). On the other hand, if step ST6 is negative, distance image generation unit 31 sets the target light receiving element as a light receiving element from which distance information D1 is not to be calculated (step ST8).

Following step ST7 or ST8, distance image generation unit 31 determines whether or not the determination whether to calculate distance information D1 is completed for all of the light receiving elements (step ST9). If step ST9 is negative, distance image generation unit 31 moves the target light receiving element to a next light receiving element (i=1+1, step ST10), and the process returns to step ST4 to repeat the steps from step ST4 onward.

If step ST9 is positive, distance image generation unit 31 calculates phase difference α from four received light signals F1, F2, F3, and F4 by Formula (1) above with respect to each light receiving element set as the light receiving element from which distance information D1 is to be calculated (step ST11), and further calculate distance information D1 by Formula (2) above (step ST12). Then, distance image generation unit 31 generates distance image S1 with distance information D1 as the pixel value of each pixel (step ST13). Thereafter, medium control unit 26 records image data of distance image S1 on recording medium 29 (step ST14), and the process is completed.

As described above, in the present embodiment, distance information D1 is calculated only from a light receiving element having an absolute value of difference between the first added signal (F1+F3) and second added signal (F2+F4) smaller than threshold value Th1. This may prevent erroneous distance measurement arising from the use of a received light signal inappropriate for distance measurement even when defective emission of stripe pattern light from emission unit 16, reception of outside light other than the reflected light by imaging unit 2, malfunction of a light receiving element in CCD 13, or the like is taking place. As a result, distance information D1 may be calculated accurately.

Further, setting of threshold value Th1 by a function of a received light signal allows the threshold value to be set according to the amount of reflected light.

In the present embodiment, a value obtained by multiplying the first added signal (F1+F3) with specific coefficient k0 is used as threshold value Th1. Alternatively, threshold values Th1 corresponding to various different first added signals (F1+F2) may be stored in internal memory 27 in advance as a table and threshold value Th1 may be obtained by referring to the table. Otherwise, a specific value may be used as threshold value Th1.

Further, in the present embodiment, the stripe pattern light is varied in a sinusoidal manner, but the stripe pattern light may be varied in any manner as long as it changes the intensity at a constant period, such as triangular wave, pulse wave, or the like.

Still further, in the present embodiment, the distance image is generated in distance measurement apparatus 1. But, the distance image may be generated by providing distance image generation unit 31 outside of apparatus 1 and outputting received light signals to distance image generation unit 31 from input/output unit 33.

So far the distance measurement apparatus according to an embodiment of the present invention has been described, but a program for causing a computer to function as a means corresponding to distance image generation unit 31 and to perform the process like that shown in FIG. 5 is another embodiment of the present invention. Further, a computer readable recording medium on which is recorded such a program is still another embodiment of the present invention.

What is claimed is:

1. A distance measurement apparatus, comprising:
   an emission unit for emitting stripe pattern light, whose intensity changes periodically, to a subject while shifting the phase of the pattern;
   an imaging unit which includes an image sensor having a plurality of light receiving elements, disposed two-dimensionally, for receiving reflected light of the stripe pattern light reflected from the subject and outputting a received light signal according to the amount of light received;
   an imaging control unit for controlling the emission unit and the imaging unit such that the stripe pattern light is emitted to the subject by shifting the phase of the pattern of the stripe pattern light by π/2 from a reference phase until the phase of the pattern light is shifted one cycle and the reflected light is received at the reference phase and at each of phases shifted by π/2, π, and 3π/2 from the reference phase; and
   a distance information calculation unit for calculating, with respect to each light receiving element, a phase difference between the stripe pattern light and the reflected light of the stripe pattern light from received light signals at four phases obtained by each light receiving element in relation to the one phase shifting cycle of the stripe pattern light, and calculating, with respect to each light receiving element, distance information representing a distance to the subject based on the phase difference,
   wherein the distance information calculation unit is a unit that calculates an absolute value of difference between a first added signal and a second added signal, the first added signal being a signal obtained by adding the received light signals at the reference phase and at the phase shifted by π from the reference phase, and the second added signal being a signal obtained by adding the received light signals at the phases shifted by π/2 and 3π/2 from the reference phase among the received light signals at four phases, and calculates the distance information only from a light receiving element having an absolute value smaller than a specific value.

2. The distance measurement apparatus of claim 1, wherein the distance information calculation unit is a unit that sets the specific threshold value as a function of a predetermined received light signal among the received light signals at four phases.

3. A distance measurement method for use with a distance measurement apparatus which includes: an emission unit for emitting stripe pattern light, whose intensity changes periodically, to a subject while shifting the phase of the pattern; an imaging unit which includes an image sensor having a plurality of light receiving elements, disposed two-dimensionally, for receiving reflected light of the stripe pattern light reflected from the subject and outputting a received light signal according to the amount of light received; an imaging control unit for controlling the emission unit and the imaging unit such that the stripe pattern light is emitted to the subject by shifting the phase of the pattern of the stripe pattern light by $\pi/2$ from a reference phase until the phase of the pattern light is shifted one cycle and the reflected light is received at the reference phase and at each of phases shifted by $\pi/2$, $\pi$, and $3\pi/2$ from the reference phase; and a distance information calculation unit for calculating, with respect to each light receiving element, a phase difference between the stripe pattern light and the reflected light of the stripe pattern light from received light signals at four phases obtained by each light receiving element in relation to the one phase shifting cycle of the stripe pattern light, and calculating, with respect to each light receiving element, distance information representing a distance to the subject based on the phase difference, the method comprising the steps of:

calculating an absolute value of difference between a first added signal and a second added signal, the first added signal being a signal obtained by adding the received light signals at the reference phase and at the phase shifted by $\pi$ from the reference phase, and the second added signal being a signal obtained by adding the received light signals at the phases shifted by $\pi/2$ and $3\pi/2$ from the reference phase among the received light signals at four phases; and calculating the distance information only from a light receiving element having an absolute value smaller than a specific value.

4. A computer readable recording medium on which is recorded a program for causing a computer to perform a distance measurement method for use with a distance measurement apparatus which includes: an emission unit for emitting stripe pattern light, whose intensity changes periodically, to a subject while shifting the phase of the pattern; an imaging unit which includes an image sensor having a plurality of light receiving elements, disposed two-dimensionally, for receiving reflected light of the stripe pattern light reflected from the subject and outputting a received light signal according to the amount of light received; an imaging control unit for controlling the emission unit and the imaging unit such that the stripe pattern light is emitted to the subject by shifting the phase of the pattern of the stripe pattern light by $\pi/2$ from a reference phase until the phase of the pattern light is shifted one cycle and the reflected light is received at the reference phase and at each of phases shifted by $\pi/2$, $\pi$, and $3\pi/2$ from the reference phase; and a distance information calculation unit for calculating, with respect to each light receiving element, a phase difference between the stripe pattern light and the reflected light of the stripe pattern light from received light signals at four phases obtained by each light receiving element in relation to the one phase shifting cycle of the stripe pattern light, and calculating, with respect to each light receiving element, distance information representing a distance to the subject based on the phase difference, wherein the program causes a computer to perform the steps of:

calculating an absolute value of difference between a first added signal and a second added signal, the first added signal being a signal obtained by adding the received light signals at the reference phase and at the phase shifted by $\pi$ from the reference phase, and the second added signal being a signal obtained by adding the received light signals at the phases shifted by $\pi/2$ and $3\pi/2$ from the reference phase among the received light signals at four phases; and calculating the distance information only from a light receiving element having an absolute value smaller than a specific value.

* * * * *